United States Patent [19]

Geiermann

[11] Patent Number: 5,131,581
[45] Date of Patent: Jul. 21, 1992

[54] MASH SEAM WELD SHEET SPLICER

[75] Inventor: Thomas J. Geiermann, Bangor Township, Bay County, Mich.

[73] Assignee: Newcor, Inc., Troy, Mich.

[21] Appl. No.: 768,462

[22] Filed: Sep. 27, 1991

Related U.S. Application Data

[63] Continuation of Ser. No. 662,289, Feb. 28, 1991, abandoned.

[51] Int. Cl.⁵ .................. B23K 11/06; B23K 11/087
[52] U.S. Cl. ................... 228/49.4; 228/4.1; 219/79; 219/81
[58] Field of Search ............. 228/4.1, 49.4, 44.3, 228/265; 72/212, 251; 219/79, 81, 102

[56] References Cited

U.S. PATENT DOCUMENTS

| Re. 26,658 | 9/1969 | McCoy. | |
|---|---|---|---|
| 2,147,868 | 2/1939 | Von Henke. | |
| 3,159,419 | 12/1964 | Kerby. | |
| 3,325,623 | 6/1967 | Briggs, III. | |
| 3,517,158 | 6/1970 | Briggs, III. | |
| 4,272,004 | 6/1981 | Nilsen | 228/17.5 |
| 4,733,815 | 3/1988 | Sturm | 228/44.3 |
| 4,872,940 | 10/1989 | Strum et al. | 156/379.8 |
| 4,973,089 | 11/1990 | Wheeler et al. | 228/49.4 |

FOREIGN PATENT DOCUMENTS

| 1515162 | 6/1969 | Fed. Rep. of Germany. | |
|---|---|---|---|
| 1565803 | 10/1972 | Fed. Rep. of Germany. | |
| 829386 | 5/1981 | U.S.S.R. | 228/49.4 |
| 837695 | 6/1981 | U.S.S.R. | 228/49.4 |

Primary Examiner—Samuel M. Heinrich
Attorney, Agent, or Firm—Flynn, Thiel, Boutell & Tanis

[57] ABSTRACT

A pair of sheets are supported on a support assembly having skewed support rollers disposed on opposite sides of an elongate guide having a pair of sidewardly opening and vertically overlapping guide grooves. The pair of sheets are disposed on opposite sides of the guide and are urged inwardly into the guide grooves so that adjacent edges of the sheets are vertically overlapped. A shuttle moves the overlapping pair of sheets toward the nip of a weld roller assembly, with the sheets being engaged by driving skewed rollers disposed directly adjacent the weld roller assembly. The sheets are drivingly moved through the nip of the weld roller assembly, with the weld roller assembly having upper and lower weld rollers which pressingly and drivingly engage the overlapping edges of the sheets therebetween to create a seam weld as the sheets move through the nip. A planish roll assembly having upper and lower planish rolls engages the seam weld directly downstream of the weld rolls to effect mashing thereof so that the resulting seam weld has a thickness which is not significantly greater than the sheet thickness.

17 Claims, 9 Drawing Sheets

MASH SEAM WELD SHEET SPLICER

This application is a continuation of U.S. Ser. No. 07/662,289, filed Feb. 28, 1991, now abandoned.

FIELD OF THE INVENTION

This invention relates to an apparatus for splicing together two metal sheets by means of a mash seam weld for creating a single larger metal sheet.

BACKGROUND OF THE INVENTION

In many manufacturing applications, thin platelike metal sheets are utilized for forming components, and the forming operation often results in leftover sheet metal pieces which are normally too small for further use and hence disposed of as waste. These waste sheet metal pieces, however, are themselves often times of significant size, and many manufacturers are desirous of being able to utilize this waste, although in most cases are unsuccessful in doing so.

In other situations the product being manufactured may require or desire use of dissimilar materials, such as having a coated or galvanized material in some regions, and a noncoated material in other regions. However, if the design requires that the critical regions be manufactured of one piece, then optimum performance, design or efficiency is generally sacrificed and the piece is formed from a piece of sheet metal having the highest requirements, such as forming the piece entirely of a plated or galvanized material, even though such plating or galvanizing is not required in its entirety.

Accordingly, it is an object of this invention to provide an apparatus which is able to improve upon the manufacturing disadvantages summarized above. More specifically, the present invention relates to an improved apparatus which can create a mash seam weld between two sheetlike pieces so as to create a larger single sheetlike piece having properties similar to a virgin or nonwelded piece. With this improvement, smaller pieces which are normally disposed of as waste can be mash seam welded (i.e. spliced) together so as to create larger useful sheetlike pieces which can hence be utilized for manufacturing purposes. Alternatively, smaller pieces of dissimilar properties, such as coated and noncoated sheetlike pieces, can be mash seam welded to create a single larger sheetlike piece which can be utilized to form a piece of manufacture having optimum properties, and at the same time permit efficient and cost effective use of materials. As a further alternative, two sheets of different thickness can be splined together by a mash seam weld.

In the apparatus of the present invention, a pair of sheetlike members are supported on a sheet support assembly having skewed support rollers disposed on opposite sides of an elongate guide having a pair of sidewardly opening and vertically overlapping guide grooves. The pair of sheets are disposed on opposite sides of the guide and are urged inwardly into the guide grooves so that adjacent edges of the sheets are vertically overlapped. A shuttle moves the overlapping pair of sheets toward the nip of a weld roller assembly, with the sheets being engaged by driving skewed rollers disposed directly adjacent the weld roller assembly. The sheets are drivingly moved through the nip of the weld roller assembly, with the weld roller assembly having upper and lower weld rollers which pressingly and drivingly engage the overlapping edges of the sheets therebetween to create a seam weld as the sheets move through the nip. A planish roll assembly having upper and lower planish rolls engages the seam weld directly downstream of the weld rolls to effect mashing thereof so that the resulting seam weld, while having a thickness greater than sheet thickness, nevertheless has a resulting thickness which is not significantly greater than the sheet thickness. The thus created one-piece larger sheet is then discharged onto a suitable conveyor or support for removal from the apparatus.

Other objects and purposes of the apparatus according to the present invention, including the structural and functional advantages associated with this apparatus, will be apparent upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The word "forward" will refer to the normal direction of movement of the sheet material through the apparatus, which direction is from left to right in FIGS. 1, 2, 4–6 and 9. The words "inwardly" and "outwardly" will refer to directions toward and away from, respectively, the geometric center of the apparatus and designated subassemblies or components thereof. Said terminology will include the words specifically mentioned, derivatives thereof, and words of similar import.

DETAIL DESCRIPTION

Figure 1:
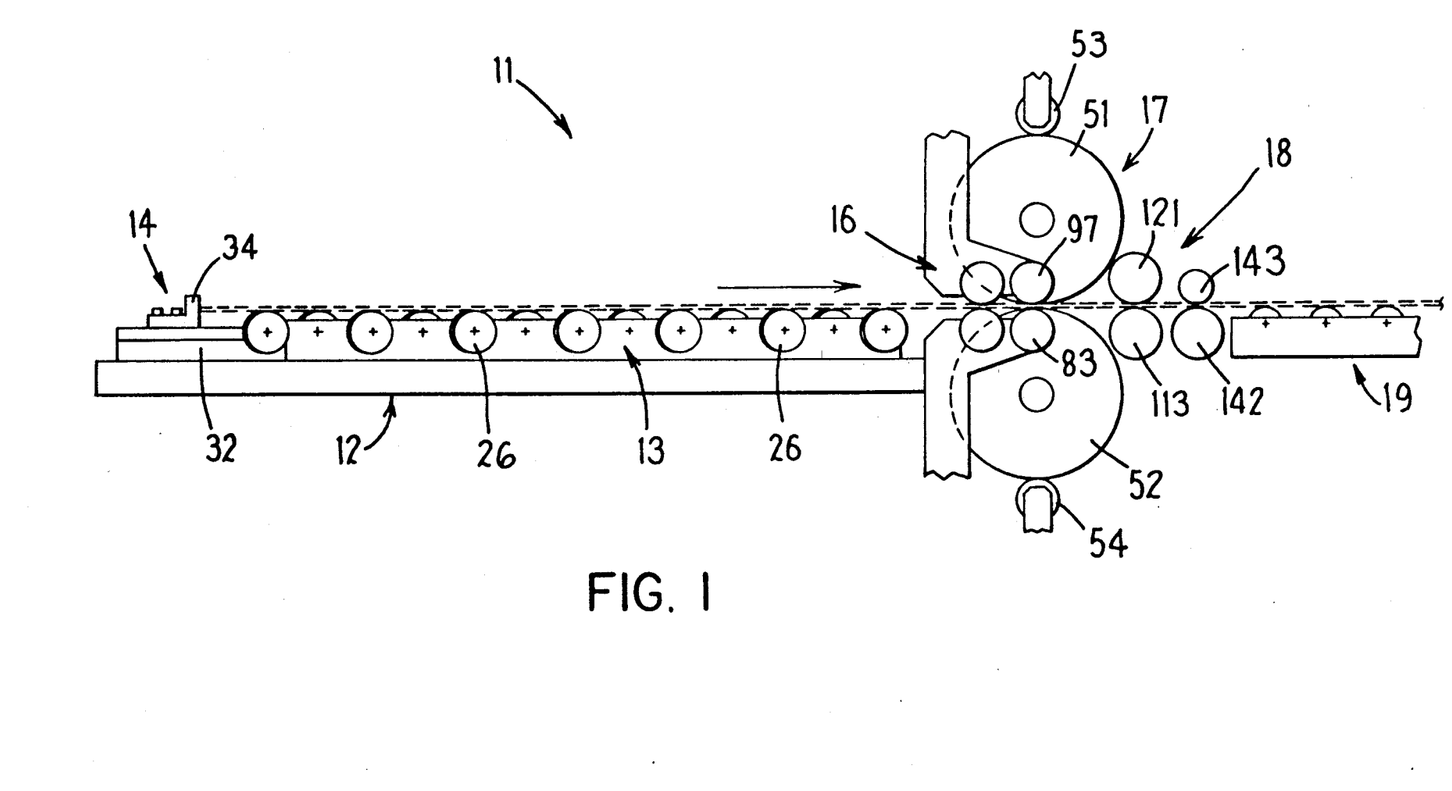
FIG. 1 is a fragmentary side elevational view which diagrammatically depicts the major subassemblies and components associated with the sheet splicing apparatus of the present invention.

Referring to FIG. 1, there is diagrammatically illustrated a sheet splicing apparatus 11 according to the present invention for permitting two smaller metal sheets to be continuously fed into and through the nip between a pair of weld rolls for creating a mash seam weld along the overlapping edges of the sheet. This splicing apparatus 11 includes a frame 12 which supports a sheet support assembly 13 on which a pair of metal sheets are positioned, and having a sheet advancing mechanism 14 associated therewith for drivingly moving the sheets forwardly for engagement at the nip of the weld rolls. A sheet overlapping guide arrangement 15 (FIG. 2) is associated with the sheet support assembly 13 for permitting the adjacent edges of the two sheets to be slightly vertically overlapped prior to insertion of the overlapped edges into the nip. A skewed roller assembly 16 is disposed directly at and slightly upstream of the weld rolls to both assist in driving the sheets into and through the nip, and to exert sideward driving force components on the sheets for preventing sideward separation of the sheets as the overlapped edges move through the weld nip. The weld head assembly 17 is located directly adjacent the skewed roller assembly 16, and directly downstream thereof there is provided a planishing assembly 18 for effecting flattening of the weld seam and reduction in the thickness thereof, following which the welded sheet is discharged onto a suitable discharge support or conveyor 19.

Figure 2:
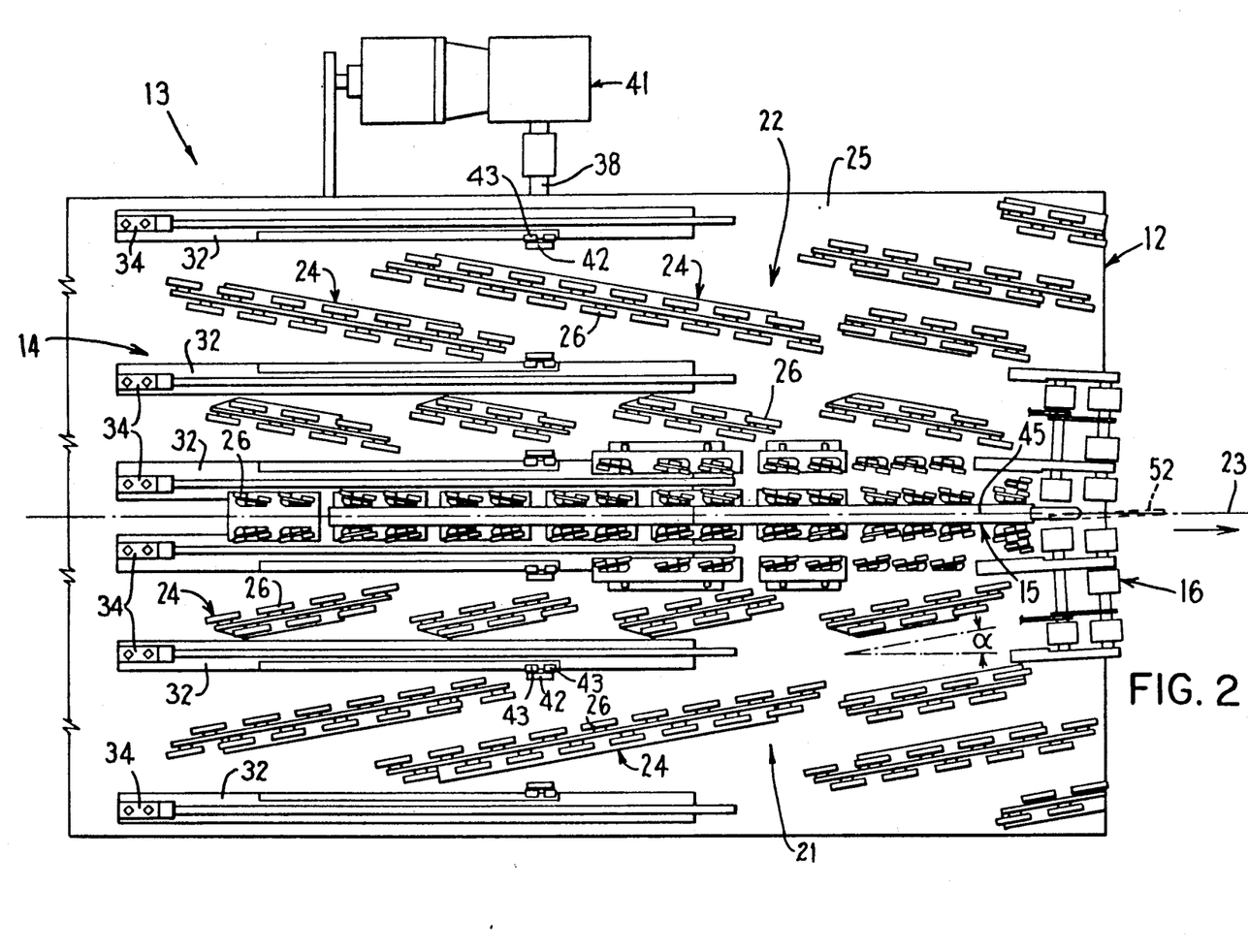
FIG. 2 is a top plan view which depicts the sheet support and advancing assemblies of the sheet splicing apparatus.
Figure 3:
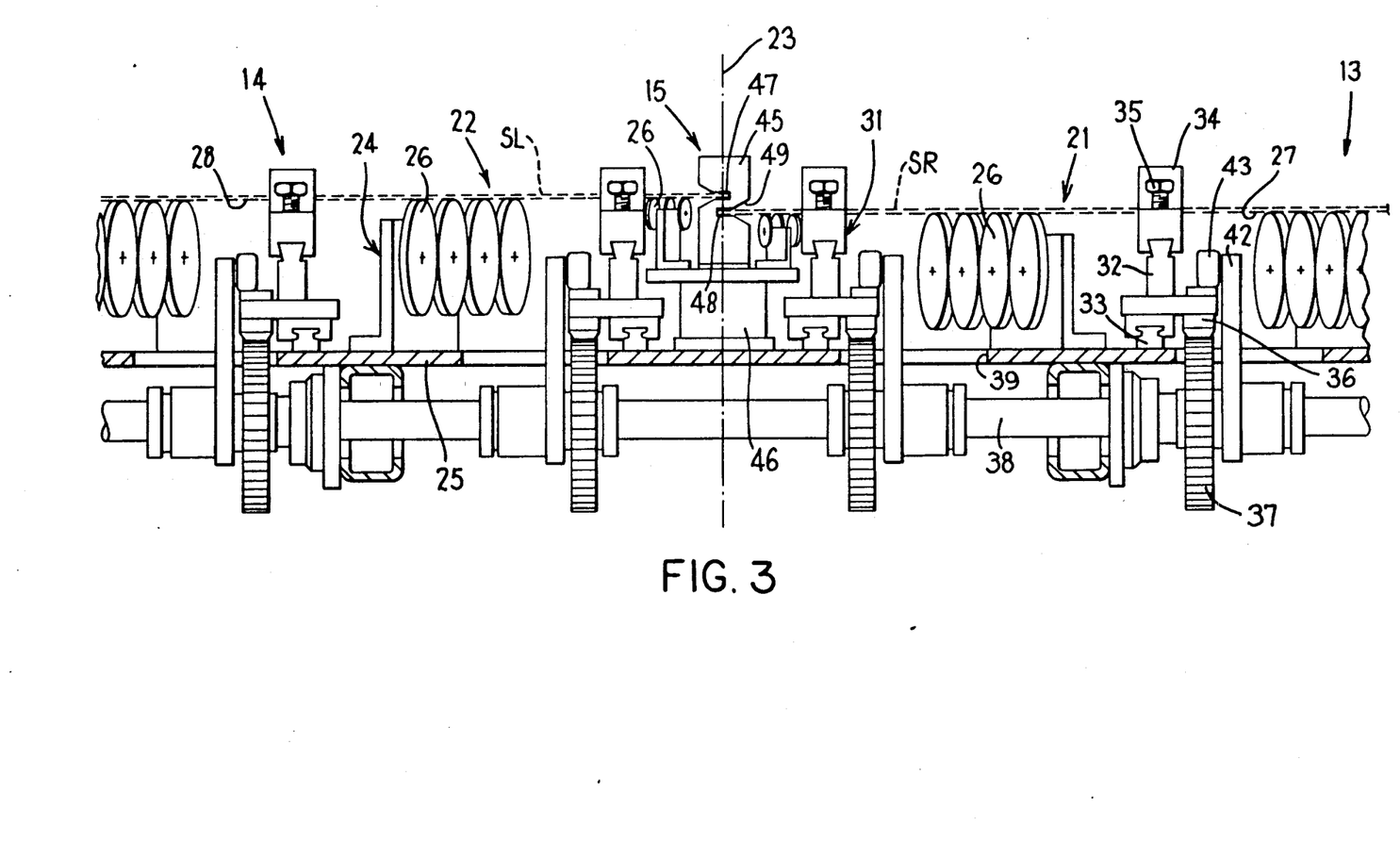
FIG. 3 is an end elevational view taken substantially from the leftward side of FIG. 2.

Referencing now FIGS. 2 and 3, the sheet support assembly 13 includes right and left sheet supports or tables 21 and 22, respectively, each being adapted for supporting thereon one of a pair of sheets $S_R$ and $S_L$ which are to be spliced together. The sheets may be rectangular or of nonregular shape, and the sheets defining the pair may be of different size and/or shape. The sheet supports 21 and 22 are mirror images of one another and are disposed so as to extend horizontally outwardly on opposite sides of a vertical plane 23 which extends centrally through the splicing apparatus including centrally through the weld nip, as described hereinafter. The sheet supports 21 and 22 each have a plurality of elongate roller assemblies 24 mounted on and projecting upwardly from a support table 25 which constitutes part of the frame 12. Each of these roller assemblies 24 mounts thereon a plurality of freely-rotatable cylindrical support rollers 26. The rollers on each assembly 24 are disposed substantially in a row which is disposed at a small skewed angle $\alpha$ relative to the central plane 23. This small skewed angle converges inwardly toward the central plane in the forward direction, with this skewed angle preferably being in the range of between about 12° and about 15°. The rollers 26 as associated with the supports 21 and 22, and the slightly skewed relationship thereof, causes the pair of sheets to be urged inwardly toward the central plane 23 as they move forwardly (rightwardly in FIG. 2). The rollers 26 associated with the right sheet support 21 all have their upper perimeters disposed so as to define a generally horizontal support plane 27 for supporting one sheet $S_R$ thereon. In similar fashion, the roller 26 associated with the left support 22 also have all of their upper perimeters disposed substantially within a single horizontal support plane 28, although this latter support plane 28, as illustrated by FIG. 3, is at an elevation slightly higher than the elevational of the support plane 27.

The sheet advancing mechanism 14 is associated with the sheet support assembly 13 and includes a reciprocating shuttle 31 for drivingly advancing the two sheets forwardly (rightwardly in FIG. 2). This reciprocating shuttle 31 includes a plurality of elongate slides 32 disposed in sidewardly spaced and generally parallel relationship, with the preferred embodiment having at least two such slides associated with each of the supports 21 and 22. The slides 32 are individually slidably supported on elongate guide rails 33 which are fixed to and project upwardly from the support table 25 and extend in generally parallel relationship to the central plane 23. Each slide 32 has an upwardly projecting drive lug 34 which projects upwardly above the respective support plane 27 or 28 so as to permit engagement with a rear edge of the respective sheet. The drive lug 34 can be individually slidably adjustably positioned relative to its respective slide 32 depending upon the size and shape of sheet being utilized, and then fixedly secured to the respective slide 32 by means of a set screw 35.

Each slide 32 has a gear rack 36 fixed thereto, which gear rack is elongated in a direction parallel to the guide rail 33 and faces downwardly. Gear rack 36 is maintained in continuous meshing engagement with a rotatable driving gear 37, the latter being fixedly secured to a rotatable drive shaft 38 which is disposed under the support table 25 and extends perpendicularly thereacross. The gear 37 projects upwardly through a suitable opening 39 formed in the support table so as to meshingly engage the respective gear rack 36.

The drive shaft 38 is rotatably driven by a suitable reversing drive unit 41 which can be energized to forwardly advance the shuttle mechanism through the desired extent, and then rearwardly move the shuttle so as to return it to its original position.

The meshing engagement between the gear rack 36 and its respective drive gear 37 is maintained by a pair of hold down rollers 43 which rollingly engage an upper surface of the respective gear rack 36. These hold down rollers 43 are mounted on a hold down arm 42 which projects downwardly and is secured to a support sleeve arrangement which is rotatably supported on the drive shaft 38.

To provide for proper positioning and overlap of the edge portions of the pair of sheets $S_R$ and $S_L$, the guide arrangement 15 includes an elongate guide bar 45 which extends throughout a majority of the length of the sheet support assembly 13. Guide bar 45 is horizontally elongated and extends along the central plane 23 so as to terminate substantially at the nip between the weld rolls. This guide bar 45 is, as illustrated by FIG. 3, substantially Z-shaped in vertical cross section, and is suitably fixedly supported on a pedestal 46 which mounts on and projects upwardly from the support table 25. The Z-shaped guide bar 45 has a pair of slots 47 and 48 formed therein and opening sidewardly in opposite directions therefrom. Each of the these slots 47 and 48 is elongated so as to extend substantially horizontally throughout the full length of the guide bar 45. Further, each slot 47 and 48 opens sidewardly though only one side of the guide bar, namely the upper slot 47 opens sidewardly through the left side of the guide bar so that the bottom or blind end of the slot is substantially coplanar with the support plane 28, whereby this slot 47 accommodates therein an edge of the one sheets $S_L$. In similar fashion, the other slot 48 opens sidewardly through the right side of the guide bar and the blind bottom thereof is substantially coplanar with the other support plane 27 so as to receive therein an edge of the other sheet $S_R$. These slots 47 and 48 are vertically spaced apart by a small extent, which extent substantially corresponds to the vertical spacing between the support planes 27 and 28. Further, the slots 47 and 48 project sidewardly into the bar through a depth sufficient to cause the slot to perpendicularly extend through the central plane 23, whereby the blind bottom portions of the slots 47 and 48 are slightly vertically overlapped. This results in the edge portions of the sheets $S_R$ and $S_L$ also being slightly vertically overlapped when the sheets are inserted into the respective slots. The slots 47 and 48 preferably have a tapered or flared mouth 49 which widens both upwardly and downwardly as it opens through the side wall of the guide bar so as to facilitate and guide the proper insertion of the edge of the sheet into the bottom of the respective slot.

The vertical spacing between the slots 47 and 48, is gradually decreased to a minimal amount as the forward end of the guide bar 45 terminates adjacent the nip between the weld rolls so as to permit the overlapping edges of the sheets to be substantially directly disposed in contact one over the other as the sheets enter the weld nip.

Figure 7:
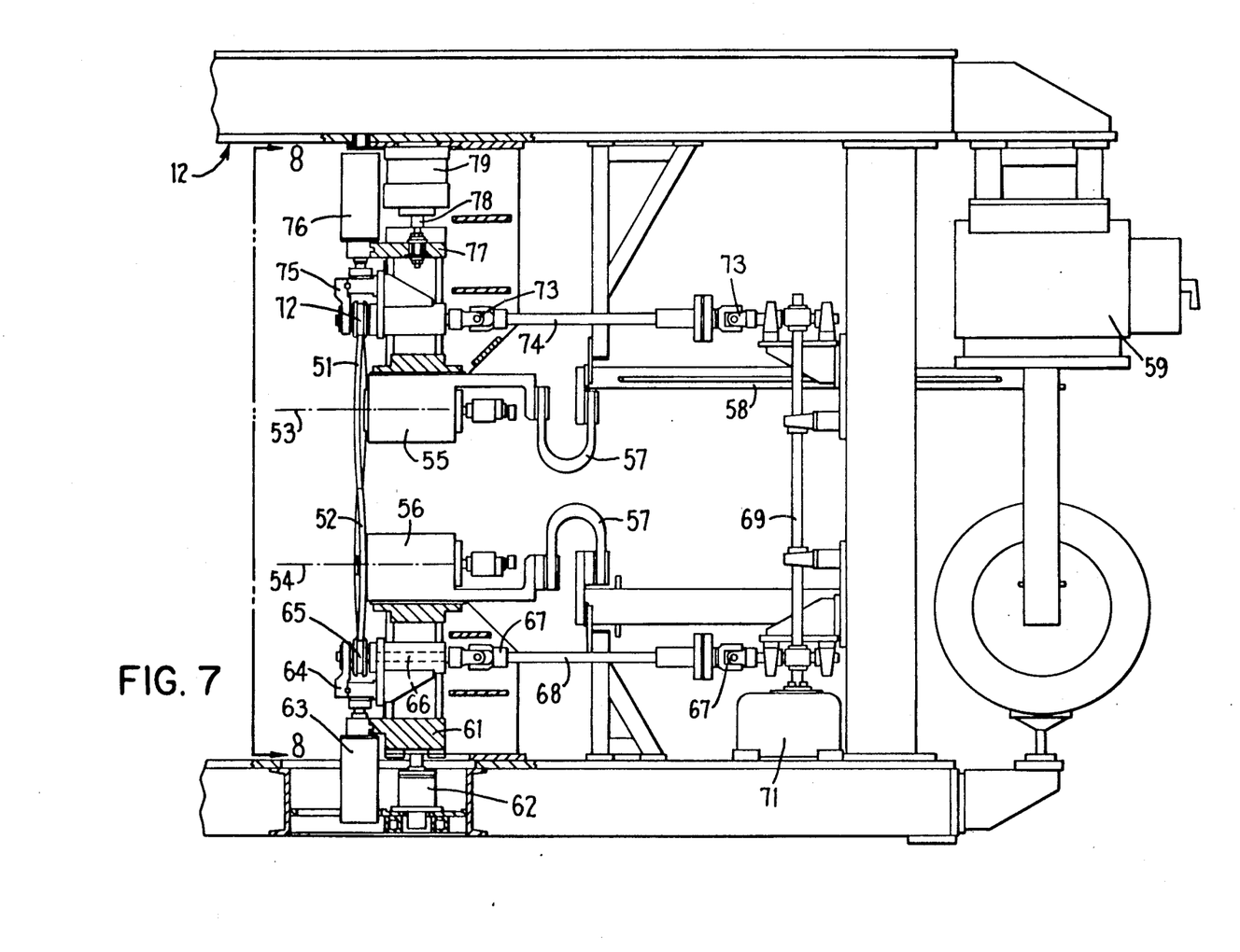
FIG. 7 is an elevational view, partially in cross section, taken just upstream of and looking toward the weld head assembly.
Figure 8:
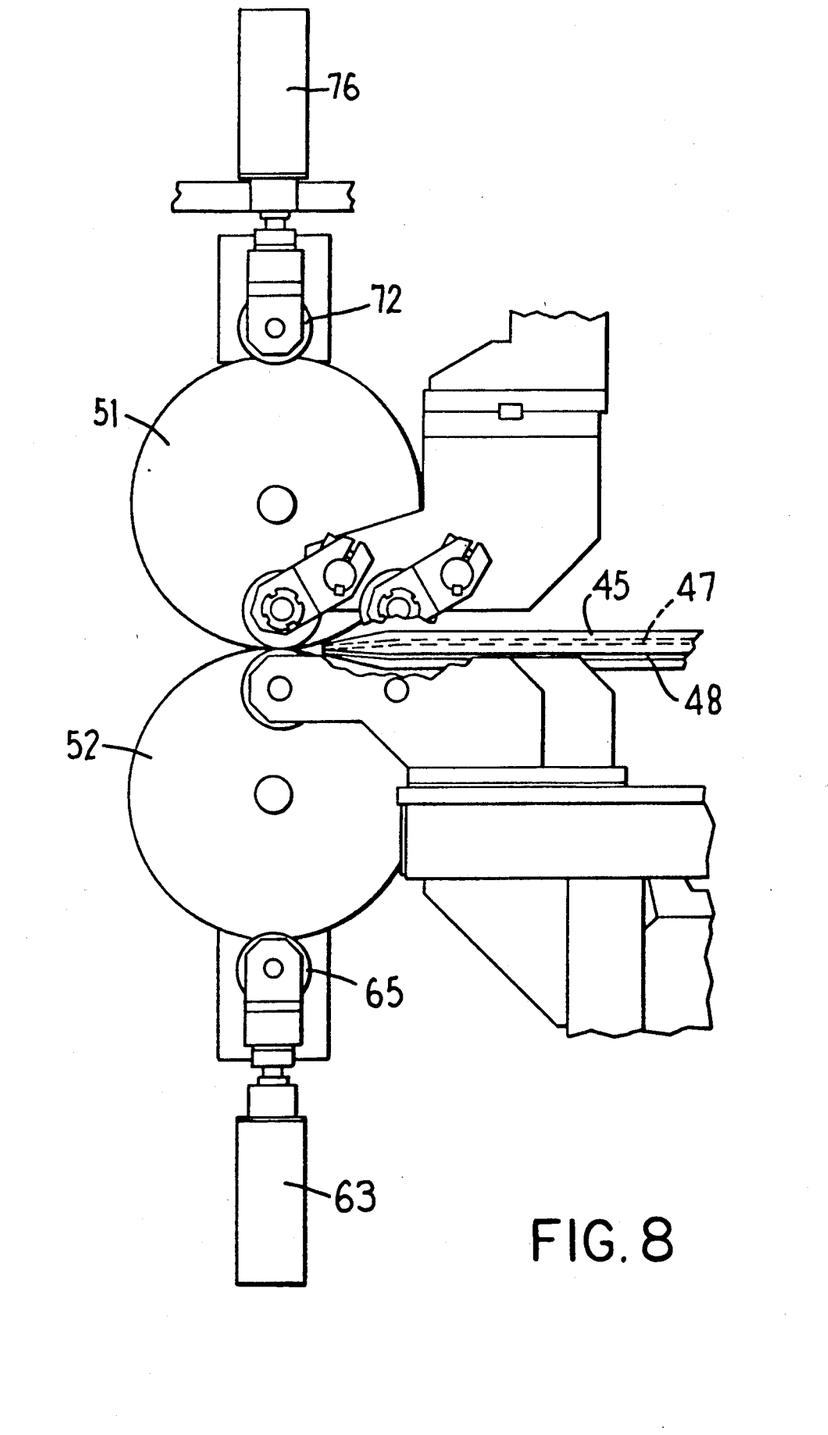
FIG. 8 is a diagrammatic and fragmentary view taken substantially along line 8—8 in FIG. 7.

Considering now the weld head assembly 17, and referring to FIGS. 7 and 8, this assembly includes a pair of large-diameter weld rolls 51 and 52 which are axially rather thin, and are constructed of a highly electrically conductive material, preferably copper alloy, so as to function as weld electrodes. The upper and lower weld rolls 51 and 52 are supported for rotation about generally horizontal axes 53 and 54, respectively, which axes 53 and 54 extend in slightly skewed relationship relative to one another. That is, the rotational axis 53 of the upper roll 51 is disposed so as to be slightly skewed from a perpendicular relationship relative to the central plane 23, which skew is preferably in the range of about 1° to about 5°. The axis 54 of the lower roll 52 is similarly skewed but in the reverse direction relative to a perpendicular to the central plane. This reverse skewing of the weld roll axes 53 and 54 is such that the rolling and pressing engagement of the rolls on the overlapping edge portions tends to push the respective edge portions toward (rather than away from) the desired overlapping relationship.

The weld rolls 51 and 52 have the shafts thereof rotatably supported within electrically conductive bearings 55 and 56, respectively, of conventional construction. These bearings each have the housing thereof connected to one end of a flexible electrically conductive strap 57, which strap at its other end is connected to a suitable electrically conductive bar 58 for connection to a suitable electrical potential source such as a transformer 59. The weld rolls 51 and 52 may have the cylindrical peripheral surfaces thereof suitably roughened, such as knurled, to assist in secure gripping engagement with the overlapping sheet metal edge portions.

To permit driving of the lower weld roll 52 and adjustment in the vertical position thereof, there is provided a support framework 61 which is vertically slidably supported on the main frame of the apparatus, which slidable framework is coupled to a suitable height adjusting drive, such as a screw jack 62. This framework 61 mounts thereon the conductive bearing assembly 56 for the lower roll to enable the height of the lower roll 52 to be adjusted as desired, although the height of this lower roll 52 normally remains stationary during operation.

The framework 61 mounts thereon the housing of a lower fluid pressure cylinder 63, which cylinder has its extendable piston rod projecting vertically upwardly and connected to a yoke 64 in which is rotatably supported a drive roller 65. This latter roller 65 is maintained in driving engagement with the lower weld roll 52, and preferably has rims or flanges which radially overlap the weld roll so as to create a constrained driving engagement therebetween. This drive roll 65 may also be knurled to ensure a positive nonslipping driving engagement with the weld roll 52 and to assist in keeping the weld roll clean.

Drive roll 65 is rotatably driven due to its being secured to a shaft 66 which is rotatably supported by the yoke 64, and this shaft 66 is drivingly coupled through a first universal joint 67 to an intermediate shaft 68 and thence through a further universal joint 67 and a suitable right-angle drive transfer device to a vertical shaft 69. This latter shaft 69 is driven from a conventional drive unit 71.

The upper weld roll 51 is similarly rotatably driven in that its periphery is confined by and drivingly engaged with a flange drive roller 72 which is disposed thereabove. This drive roller 72 has the shaft thereof coupled through a universal joint 73 to an intermediate shaft 74, which in turn is coupled through a further universal joint and through a further right-angle drive to the vertical shaft 69 for driving by the drive unit 71.

The upper drive roller 72 is rotatably supported on a yoke 75 which is coupled to the downwardly projecting piston rod associated with a fluid pressure cylinder 76. The housing of this upper pressure cylinder 76 is fixedly carried on a slidable support framework 77, the latter being slidably supported for limited vertical displacement relative to the main frame. This framework 77 mounts thereon the support bearing assembly 55 for the upper weld roll 51. Framework 77 is also coupled to the reciprocal piston rod 78 associated with a further pressure cylinder 79, the latter having its housing fixed to an upper cross beam associated with the main frame, which cross beam extends transversely of the machine and has opposite ends thereof fixedly supported on suitable vertical support beams, one of which is shown in FIG. 7.

The skewed roller assembly 16, as illustrated by FIGS. 1, 2 and 8, is disposed substantially directly adjacent the upstream end of the nip between the weld rolls 51 and 52, and on substantially opposite sides thereof, whereby this skewed roller assembly ensures positive drive and control of the sheets as they move into and through the nip by not only driving the sheets forwardly, but by also applying an inwardly directed component of driving force so as to maintain proper overlap between the sheets and prevent sideward spreading or separation thereof due to the pressure imposed by the weld rolls.

Figure 4:
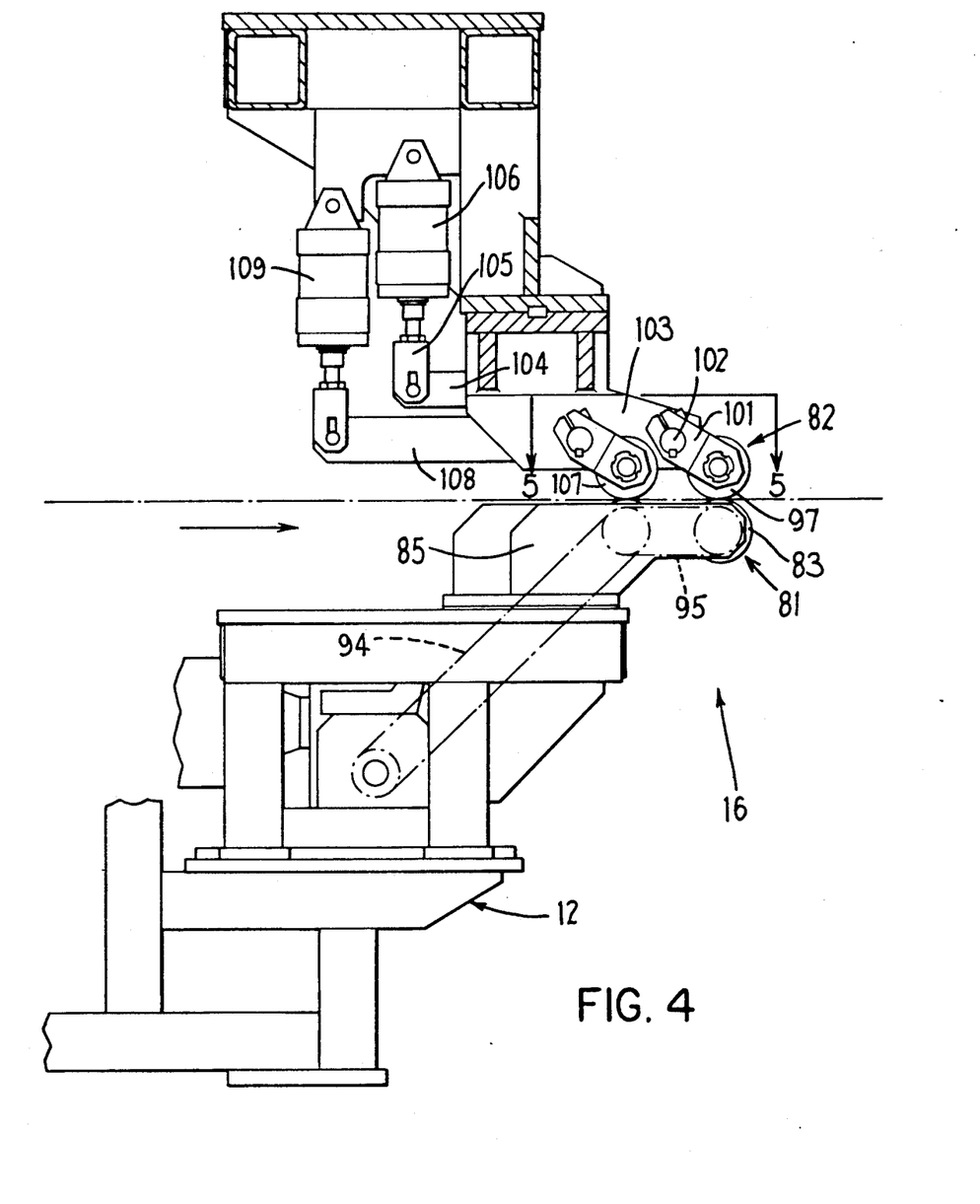
FIG. 4 is a fragmentary side elevational view, partially in cross section, of the skewed roller assembly as disposed adjacent the weld rolls.
Figure 5:
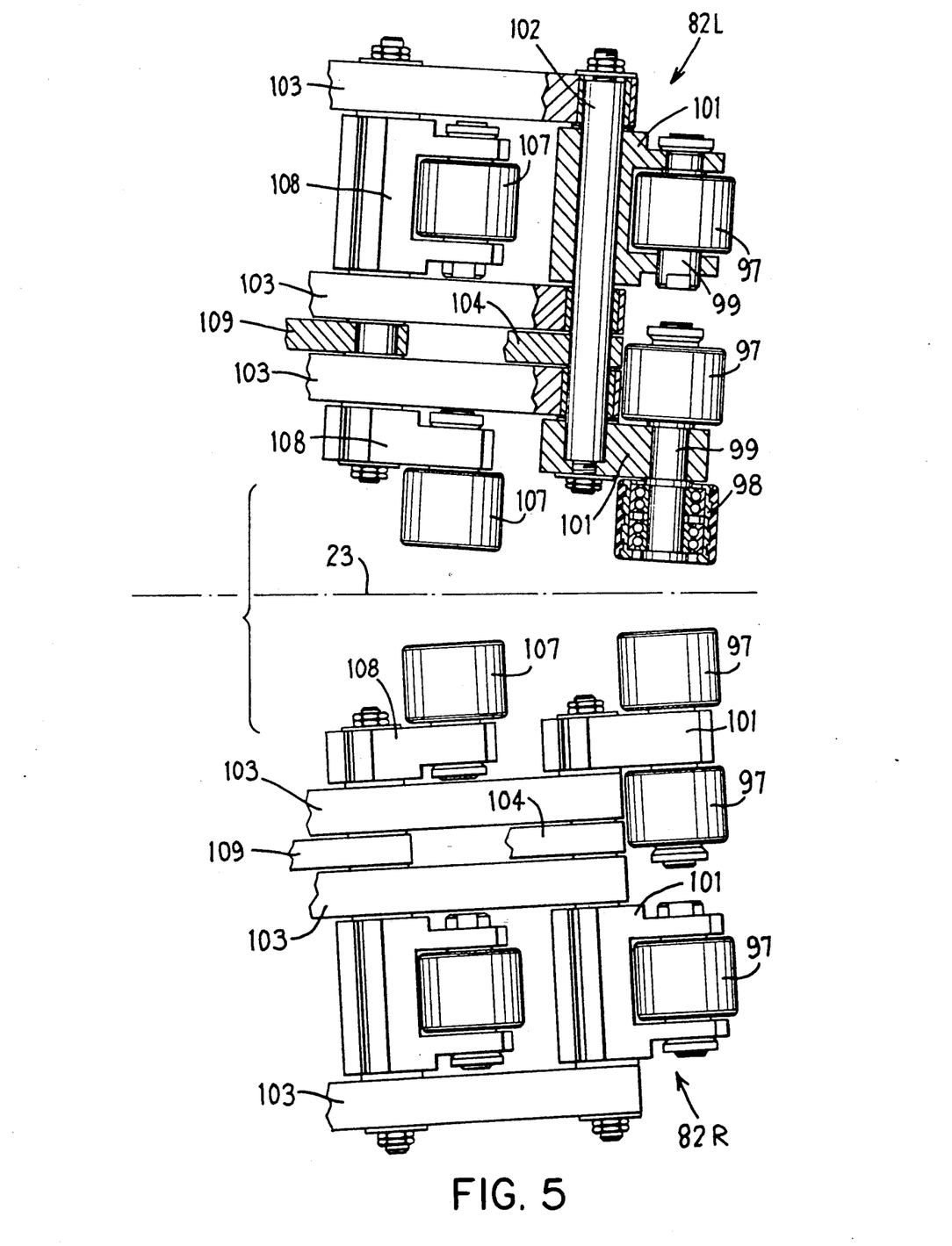
FIG. 5 is a fragmentary top view, partially in cross section, of the top hold down roller subassembly associated with the skewed roller assembly.

The skewed roller assembly 16 as illustrated in FIG. 4 includes a lower drive roller assembly 81 and an upper hold down roller assembly 82, which assemblies cooperate for securely drivingly gripping and holding the sheets therebetween so as to maintain the sheet edge portions in proper overlapped relationship. Each of these lower and upper assemblies 81 and 82, respectively, include, as depicted by FIGS. 5 and 6, substantially identical right and left roller subassemblies which are substantially mirror images disposed on opposite sides of the central plane 23.

Figure 6:
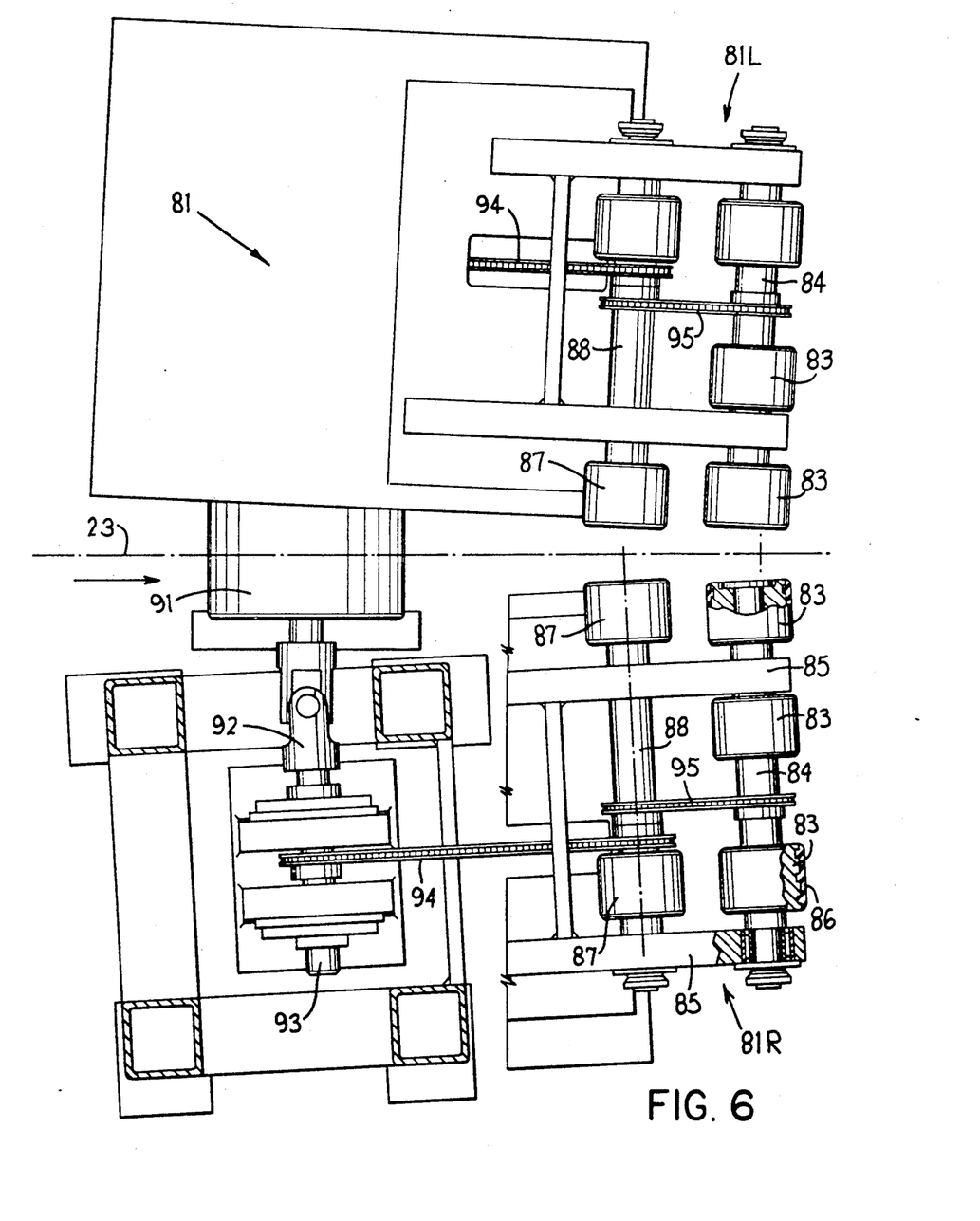
FIG. 6 is a top view, partially in cross section, of the bottom drive roller subassembly associated with the skewed roller assembly.

The lower drive roller assembly 81, as shown by FIGS. 4 and 6, includes the right and left subassemblies designated 81R and 81L. Each of these subassemblies includes one or more generally cylindrical drive rollers 83 coaxially aligned and nonrotatably secured to a rotatable shaft 84, the latter being rotatably supported on suitable stationary frame elements 85. The rollers 83 each have a generally annular rubberlike rim or cover 86 therearound for permitting secure and nonslipping engagement with the respective sheet. The plurality of coaxially aligned rollers 83 hence effectively define a single roller of significant axial extent, and in fact can be replaced by a single roller if desired. The roller 83 engages the respective sheet directly sidewardly of the weld nip so as to provide desirable gripping and control of the sheet as it enters into and through the weld nip.

The roller subassembly also includes, in the illustrated embodiment, one or more additional drive rollers 87 which are substantially identical to the rollers 83 and are nonrotatably secured to a further shaft 88 which is rotatably supported on the frame elements 85. Shaft 88 extends generally parallel with the shaft 84 but is displaced slightly rearwardly therefrom but in substantially the same horizontal plane. The rollers 83 and 87 are all synchronously driven at the same speed, and for this purpose there is provided a drive motor 91 which is coupled through a universal joint 92 to a drive shaft 93. The latter has a sprocket thereon engaged with a drive element or chain 94 which engages a similar sprocket on the shaft 88 for effecting rotation thereof. The shafts 84 and 88 have further opposed sprockets engaged by a further chain 95 so that both shafts 84 and 88 are synchronously and identically rotated. The roller subassemblies 81R and 81L are identically and simultaneously rotated by virtue of the mechanism depicted in FIG. 6, with the driving of the subassembly 81L being accomplished by an arrangement identical to that illustrated by the mechanism 81R.

The rotational axis of the shaft 84 (and also that of the shaft 88) is disposed so as to be slightly skewed relative to a horizontal line perpendicular to the central plane 23. That is, the outer end of the shaft 84 is horizontally advanced forwardly relative to the inner end, whereby the axis of shaft 84 is skewed forwardly at a small angle (normally in the range of 2° to about 10°) relative to a perpendicular to the central plane 23, with the skew angle of rollers 83, 87 being normally slightly larger than the skew angle of the weld rolls 51, 52. This results in the drive rollers 83 imposing a driving force component on the sheet which is directed inwardly toward the central plane 23, and since both assemblies 81R and 81L impose such an inwardly directed force component, this resists any tendency for the sheets to spread or separate due to the compression force applied thereto by the weld rolls. This resistance to separation between the sheets is particularly achieved since the skewed drive rollers 83 sidewardly straddle the weld rolls substantially directly at the weld nip.

The upper hold down roller assembly 82, as depicted by FIGS. 4 and 5, is of similar construction with respect to the number, position and general orientation of the rollers as in the lower assembly 81. More specifically, the upper hold down roller assembly 82 again includes right and left subassemblies 82L and 82R which are basically mirror images of one another and disposed uniformly on opposite sides of the central vertical plane 23. Each of these subassemblies include a plurality of hold down rollers 97 which are coaxially aligned and each has a rubberlike cover or rim 98 to permit secure gripping with the respective sheet. The coaxially aligned rollers 97 are positioned such that each individual roller 97 is disposed directly over a respective one of the lower rollers 83. Rollers 97 are secured to shafts 98 which are freely rotatably supported on the ends of arms 101, the latter being fixedly secured to a pivot shaft 102 which is rotatably supported within frame elements 103. Pivot shaft 102 is in turn fixedly secured to one end of an elongate lever 104, the latter being coupled at its free end to the piston rod 105 of an actuator 106 (specifically a fluid pressure cylinder) which is mounted on the frame of the apparatus. Actuation of cylinder 106 so as to move piston rod 105 upwardly hence causes arm 101 to be swung downwardly about pivot shaft 102, whereby roller 97 is moved downwardly to securely and drivingly engage the sheet between the opposed rollers 97 and 83.

The upper assembly 82 also includes a further pair of hold down rollers 107 which are individually positioned so as to be directly aligned above the lower drive rollers 87. These upper hold down rollers 107 are freely rotatably supported on the ends of arms 108 which are centrally pivoted and at their rearward ends joined to the piston rod of a further pressure cylinder 109, which cylinder when upwardly energized causes the rollers 107 to swing downwardly in the same manner as described above relative to the rollers 97.

The upper hold down subassemblies 82R and 82L are also slightly skewed relative to the central plane 23 in the same manner as the lower subassemblies, as explained above.

To both planish and mash the seam weld (that is, both smooth and reduce the thickness of the seam weld) created between the weld rolls 51 and 52, a roller-type planishing assembly 18 is disposed for engagement with the seam weld directly downstream of the weld nip. In fact, the planishing assembly 18 is preferably disposed as close to the weld nip discharge as is possible so that the seam weld will still be hot so as to facilitate flattening and smoothing of the seam weld, and reduction in the thickness thereof, due to the mashing engagement thereof by the planishing assembly.

Figure 9:
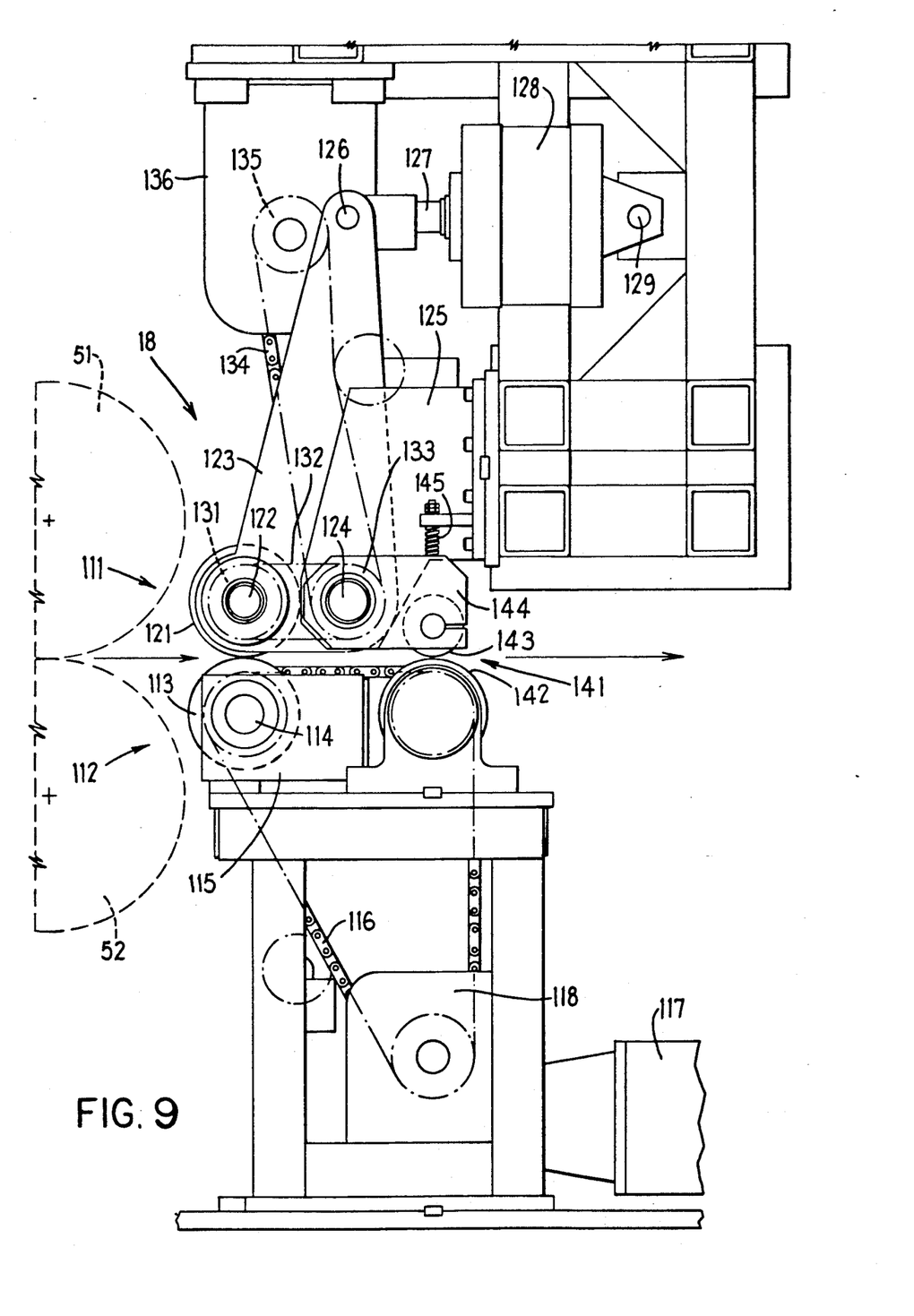
FIG. 9 is an elevational view showing the planishing assembly as disposed directly downstream of the weld rolls.

As illustrated by FIG. 9, the planishing assembly 18 includes upper and lower planishing subassemblies 111 and 112, respectively. The lower subassembly 112 includes a lower planishing roll 113 which is supported on a shaft 114 for rotation about a horizontal axis which extends generally perpendicular to the central plane 23. This roll 113 is disposed with its upper cylindrical periphery substantially horizontally aligned with the nip between the weld rolls, and the roll 113 has an axial width which normally slightly exceeds the width of the seam weld so as to permit engagement with the weld seam over the complete width thereof.

The lower planish roller 113 is rotatably supported on a frame member 115, and is rotatably driven by a suitable drive element 116, such as a chain, from a conventional drive motor 117 through a conventional gear speed reducer 118.

The upper planish subassembly 111 includes an upper planish roll 121 which is substantially identical to the lower roll 113 and is adapted to be urged downwardly substantially for pressure contact therewith. This upper roll 121 is supported for rotation by a shaft 122 which extends parallel with the lower shaft 114. Shaft 122 is rotatably supported on one arm of a generally triangularly-shaped bell crank 123, the latter being pivotally supported by a pivot shaft 124 on a stationary frame element 125. The bell crank 123 has an arm which projects vertically upwardly a significant extent and has a pivot connection 126 at the upper end thereof joined to a piston rod 127 of an actuator 128 (specifically a fluid pressure cylinder). This actuator 128 has the housing thereof coupled to the frame by a pivot or clevis 129. When actuator 128 is energized to extend the piston rod 127 leftwardly in FIG. 9, then lever 123 is pivoted counterclockwise about pivot 124 so as to cause planish roller 121 to move downwardly and exert a planishing and mashing pressure onto the seam weld which is engaged between the planishing rolls 113 and 121. At the same time the rolls 113 and 121 are both rotatably driven so as to effect rightward driving of the spliced sheet away from the weld rolls. For this purpose, the planish roll shaft 122 has a sprocket 131 thereon engaged with a drive chain 132 which is engaged with a sprocket 133 is supported for rotation about the axis of the pivot shaft 124. This sprocket 133 is engaged with a further chain 134 connected to a drive sprocket 135 associated with a conventional drive unit 136.

The skew, weld and planish rolls are all synchronously driven so as to have substantially identical forward contact velocities with the metal sheets.

To assist in discharging the spliced sheet away from the weld head assembly 17 and the planishing assembly 18 onto the discharge support conveyor 19, there is provided a sheet discharger 141 (FIG. 9) disposed slightly downstream of the planish assembly 18. This sheet discharger 141 includes a lower discharge drive roller 142 which is rotatably supported on the frame and is rotatably driven by the lower drive chain 116. This lower discharge drive roller 142 preferably includes at least a pair of axially elongate rollers disposed for engaging the spliced sheet on opposite sides of the seam weld to assist in discharging the sheet onto the discharge conveyor 19.

The sheet is held down and in driving engagement with the discharge roller 142 by an upper hold down roller 143 which is disposed directly above the lower roller 142. This hold down roller 143 is rotatably mounted on the end of a lever arm 144 which is supported for pivoting movement about the pivot shaft 124. A suitable spring 145 coacts between the frame and the lever arm 144 for urging the roller 143 downwardly to permit secure gripping and driving engagement of the spliced sheet with and between the opposed rollers 142 and 143.

While the operation of the splicing apparatus 11 of the present invention is believed apparent from the description given above, nevertheless same will be briefly described below to ensure a complete understanding thereof.

In operation, a pair of metal sheets $S_R$ and $S_L$ to be spliced are positioned, either manually or automatically, on the right and left roller-type sheet supports or tables 21 and 22. The sheets are normally positioned so that the inner edges thereof are close to the respective guide slot 47 and 48, with the rear edge of the sheet substantially abutting the drive lugs 34. The drive shuttle 31 is then activated so as to drive the sheets inwardly (rightwardly in FIG. 2) toward the weld head assembly. During this inward driving of the sheets, the support thereof on the skewed rollers 26 ensures that the pair of sheets are moved inwardly toward one another so that the inner edges thereof move into and abut against the bottoms of the respective grooves 47 and 48, whereby the inner edge portions are slightly vertically overlapped. When the leading edges of the sheets move forwardly a sufficient extent, they are engaged between the opposed pairs of rollers associated with the skew roller assembly 16. The lower skew rollers 83 and 87 create a driving engagement with the lower surfaces of the sheets, and at the same time the upper skew rollers 97 and 107 are pushed downwardly against the upper surfaces of the sheets due to upward activation of the pressure cylinders 106 and 109. These opposed pairs of skewed rollers 83, 97 and 87, 107 securely grip both sheets on opposite sides of the weld rolls, and at the same time not only effect forward driving of the sheets in synchronization with the driving engagement thereof by the weld rolls, but also exert an inwardly directed force component on each sheet tending to push it inwardly toward the weld nip so as to prevent separation between the sheets due to the compressive pressure applied to the overlapped edges by the weld rolls.

Simultaneous with this operation of the skew rollers, the overlapping edges of the sheets move into and through the nip defined between the upper and lower weld rolls 51 and 52. The lower weld roll 52 maintains a fixed elevation and hence a fixed support for the overlapping edge portions of the sheets, but the upper weld roll is pushed downwardly by the pressure cylinder 76 so that a desired high clamping force is imposed on the overlapping edges of the sheets by the engagement thereof between the weld rolls 51 and 52. Simultaneous with this engagement of the overlapping edge portions between the weld rolls 51 and 52, welding current is transmitted through the overlapping edge portions of the sheets which, in conjunction with the rotatable driving and compressive gripping engagement of the weld rolls with the overlapping edge portions, results in creation of a continuous seam weld at the overlapping edge portions of the sheets as the sheets move through the weld nip.

During the welding of the sheets by the rolls 51 and 52, the weld rolls 51 and 52 are supported and driven in such manner as to prevent slippage thereof. For example, a large compressive contact force is imposed on the lower weld roll 52 by the drive wheel 65. This contact force is generated in the pressure cylinder 63 and exerted upwardly through its piston rod to the yoke 64 and thence to the drive wheel 65 for imposition against the lower weld roll 52. At the same time, the upwardly directed force imposed by drive wheel 65 on the lower part of weld roll 52 is resisted by the shaft 54 and the bearing 56, which in turn is coupled to the framework 61 which also mounts thereon the housing of the pressure cylinder 63. Thus, all of the contact forces to ensure positive rotation of the weld wheel are effectively contained within this overall assembly, and are not transmitted onto the remainder of the apparatus or onto the supporting frame.

In similar fashion, the downward compressive force from cylinder 76 is imposed on yoke 75 and drive roller 72 for transmission to the upper weld roll 51, and this is resisted by the force being transmitted from the shaft 53 through bearing 55 back to the framework 77, which framework mounts thereon the housing of the pressure cylinder 76. Hence, this cylinder 76 is able to exert a significant contact force between roll 51 and wheel 72 so as to prevent slippage therebetween. This force, however, is independent of weld force created by the pressure cylinder 79.

If any adjustment in the height of the lower weld roll 52 is necessary, this can be accomplished by actuation of the mechanical jack 62, and such adjustment is independent of the drive contact pressure imposed on the roll 52.

Due to the significantly high compressive force which can be applied on the overlapping edges of the sheets by cylinder 79 simultaneous with the welding thereof, the resulting seam weld when leaving the nip between the weld rollers has a thickness which is less than the combined thickness of the two sheets. In fact, the thickness of the seam weld when leaving the weld nip will normally be in the order of about 40% greater than the thickness of a single sheet if both sheets are of the same thickness.

Immediately upon leaving the nip between the weld rolls 51 and 52, the seam weld is moved into and through the nip between the planishing rolls 113 and 121, which rolls rotate synchronously with the weld rolls and apply further high compressive force to opposite sides of the seam weld so as to further compress the weld to effect both smoothing and thickness reduction thereof. These planishing rolls 113 and 121 are simultaneously rotatably driven so as to effectively drivingly advance the spliced sheet toward the discharge station, and at the same time the pressure cylinder 128 is activated to urge the roll 121 downwardly so as to exert a high compressive force on the seam weld as it passes between the rolls 113 and 121. This is effective for further significantly reducing the overall thickness of the weld so that the weld, upon exiting the planishing rollers, will have a thickness which normally only slightly exceeds the thickness of a single sheet. For example, the thickness of the seam weld upon existing the planishing rollers will have a thickness which is normally only about 10% greater than the original sheet thickness.

The contact force imposed on the seam weld at the planish nip is normally several times, such as eight to ten times, greater than the contact force at the weld nip.

The spliced sheet upon exiting the planished rollers is engaged by the discharge rollers 142 and 143 which further forwardly drive the sheet for discharge onto the discharge support or conveyor 19.

With the desirable splicing arrangement of this invention, two waste sheets can be readily spliced together in a manner whereby a substantially continuous seam weld is formed along overlapping edges of the sheets, which seam weld is suitably mashed and planished so that the resulting splice has a thickness which is significantly no greater than the thickness of the original sheets, thereby resulting in a single enlarged sheet which has physical and material properties similar to the original sheets, thereby permitting efficient utilization of the spliced sheet and hence more economical and cost saving utilization of sheet materials. In addition, the weld seam is created as the pair of metal sheets are moved continuously and sequentially through the weld and planish nips. Further, the two sheets can be different, for example one can be coated and the other noncoated, with the two being spliced together to form a single sheet having portions of different properties. Alternately, the two sheets themselves can be of different sizes, shapes and/or thicknesses, with the overlapping edges being spliced together to form a single sheet having portions of different thickness. With this arrangement, thin steel sheets can be readily spliced together in an efficient and cost saving manner since the splicing apparatus permits formation of substantially continuous seam welds along overlapping edges at a relatively high rate of speed, whereby significant numbers of such sheets can be spliced together both efficiently and economically. In addition, the arrangement of creating the seam weld, and specifically the manner in which forces are transmitted to the weld rolls for mashing of the seam weld, permits the use of relatively thick sheets while still being able to provide a desirable mash seam weld for splicing the two sheets together. In fact, it is believed that the splicing apparatus of this invention can successfully accommodate two sheets having a combined overlapped thickness in the neighborhood 3½ millimeters, while at the same time being able to provide a desirable mash seam weld therebetween for splicing the sheets together.

While the splicing apparatus has been described above as employing roughened surfaces on the weld rolls and the drive rolls therefor, it will be appreciated that these rolls can also be smooth and, in fact, when working with plated sheet materials such as galvanized materials, use of smooth surfaces is believed preferred to avoid or minimize collection of plating materials on the surface of the weld rolls. Further, in such situation, there is additionally preferably provided rotatable wire brushes (such as wire brush wheels) disposed adjacent each of the upper and lower weld rolls and maintained in rotatable brushing engagement with the peripheral surfaces of the weld rolls so as to assist in maintaining these surfaces clean.

In addition, while most uses of the splicing apparatus will also require operation of the planish roll assembly so as to significantly reduce the thickness of the weld seam, nevertheless in some situations the thickness of the weld seam may either be suitable immediately upon leaving the weld assembly or minimization of the thickness may not be required. In those situations the planish rolls can be maintained in an inactive position so as to omit the planishing step as one of the operations.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A splicing apparatus for creating a seam weld along overlapping edge portions of first and second metal sheets, comprising:
    frame means;
    a welding assembly including upper and lower weld rolls supported for rotation about substantially horizontal axes which are vertically spaced apart, said upper and lower weld rolls being positioned substantially directly vertically one above the other so as to define a nip which extends horizontally therebetween for accommodating overlapping edge portions of said sheets;
    drive means coupled to said weld rolls for effecting rotation thereof in opposite directions so that the weld rolls drivingly engage the overlapping edge portions of the sheets to effect driving thereof in a forward direction through the nip;
    sheet-supporting table means positioned upstream of said weld assembly for substantially horizontally supporting said sheets in generally upwardly facing but side-by-side relation;
    horizontally elongated guide means extending centrally along said table means substantially in alignment with an upstream end of said nip for guiding and positioning adjacent edge portions of said sheets into a vertically overlapping relationship prior to feeding thereof into said nip, said guide means being stationarily supported relative to said table means and terminating in a downstream nose end which is disposed substantially aligned with and closely adjacent the upstream end of said nip;

said sheet-supporting table means including first and second table portions disposed in side-by-side relationship and respectively defining thereon first and second horizontally-enlarged and upwardly-facing support surfaces for respectively supporting the first and second sheets;

said guide means including a generally horizontally elongate guide rail which projects generally horizontally between said first and second table portions and includes first and second guide grooves for respectively accommodating side edges of the first and second sheets, said first and second guide grooves extending generally horizontally throughout the elongate direction of the guide rail, said first guide groove opening generally horizontally sidewardly toward and substantially at the elevation of the first support surface, said second guide groove opening generally horizontally sidewardly toward and substantially at the elevation of said second support surface, said first and second guide grooves projecting horizontally inwardly into said guide rail from opposite sides thereof and through a depth such that bottom portions of said first and second guide grooves vertically overlap, each of said guide grooves having a bottom abutment surface for limiting insertion of the respective sheet while permitting edge portions of the sheets to be vertically overlapped when inserted into said grooves;

sheet advancing means associated with said table means for simultaneously engaging said first and second sheets when positioned on said first and second table portions for generally horizontally moving said sheets forwardly toward the weld assembly for engagement with the weld rolls;

a planish assembly positioned adjacent but downstream of said weld assembly for compressing and reducing the thickness of the seam weld so that the overall thickness thereof is similar in magnitude to the original sheet thickness, said planish assembly including upper and lower planish rollers disposed vertically one above the other and defining a nip therebetween which is generally aligned with the nip of said weld rolls, and pressure means cooperating with said planish rollers for relatively pressing said planish rollers together for effecting compression and flattening of the seam weld as it passes through the planishing nip; and a skewed roller assembly positioned directly adjacent and on opposite sides of the weld nip for rolling engagement with upper and lower surfaces of said sheets and for imposing sidewardly directed forces on said sheets which tend to prevent said sheets from moving sidewardly away from one another.

2. An apparatus according to claim 1, wherein each of said table portions includes a roller assembly having a plurality of freely-rotatable rollers disposed for rotation about generally parallel and substantially horizontal axes, the plurality of freely-rotatable rollers defining thereon uppermost points which define the respective support surface for engagement with the respective sheet, said last-mentioned rollers supporting the sheet for forward advancing movement but having the axes thereof slightly skewed relative to a perpendicular to the forward direction so as to urge the sheet inwardly into the respective guide groove as the sheet is forwardly advanced.

3. An apparatus according to claim 1, wherein the skewed roller assemblies include upper and lower skewed roller subassemblies which grippingly engage the sheets therebetween, said assemblies defining a pair of skewed rollers disposed in straddling relationship on opposite sides of the respective weld roll, the skewed rollers of each pair being skewed relative to one another and relative to the forward direction so as to impose on the respective sheet a holding force directed inwardly toward the weld roll as the sheet moves forwardly.

4. An apparatus according to claim 3, including drive means coupled to the lower skewed rollers for effecting driving rotation thereof as said skewed rollers engage bottom surfaces of said sheets, the upper skewed rollers being freely rotatably supported for rolling engagement with upper surfaces of the sheets, mounting means supporting said upper skewed rollers for vertical displacement toward and away from said sheets, and pressure means cooperating with said mounting means for urging said upper skewed rollers downwardly toward said lower rollers for effecting secure engagement of the sheets between the upper and lower skewed rollers.

5. An apparatus according to claim 1, wherein said weld assembly includes upper and lower drive wheels having cylindrical peripheral surfaces which are respectively disposed in direct driving engagement with cylindrical peripheral surfaces of the upper and lower weld rolls, drive means coupled to said upper and lower drive wheels for effecting driving rotation thereof, upper and lower frameworks vertically movably supported on said frame means and respectively rotatably mounting said upper and lower weld rolls thereon, adjustment means coacting between said frame means and said lower framework for permitting adjustment in the height of said lower weld roll, drive means coacting between said frame means and said upper framework for permitting vertical raising and lowering of said upper weld roll and for moving said upper weld roll downwardly for pressurized contact with the overlapping edge portions of said sheets, and upper and lower pressure means respectively mounted on the upper and lower frameworks for controlling the drive pressure engagement between each said weld roll and the respective drive wheel while preventing transmission of the drive pressure to the frame means.

6. An apparatus according to claim 1, wherein said planish assembly includes a frame on which said lower planish roller is supported for rotation about a generally fixed axis, support means movably supporting said upper planish roller for vertical displacement relative to said frame means, pressure means coupled to said support means for effecting downward compression of said upper planish roller toward said lower planish roller for effecting squeezing of the weld seam between the upper and lower planish rollers, and drive means coupled to the lower and upper planish rollers for effecting rotation thereof.

7. An apparatus according to claim 6, including a sheet discharging roller supported adjacent and downstream of said lower planish roller for rotatable driving engagement with the lower surface of the spliced sheet, said discharge roller being rotatably drivingly coupled to said first drive means, and a spring-urged upper discharge roller spring-urged downwardly toward the lower discharge roller for exerting a hold down force against the spliced sheet.

8. An apparatus according to claim 1, wherein said upper and lower weld rolls are each slightly skewed relative to the forward direction and are skewed in opposite directions so that the weld rolls exert a sideward force on the sheets which tend to hold the sheets to prevent sideward separation thereof.

9. An apparatus according to claim 1, wherein said sheet advancing means includes a reciprocal shuttle associated with said table means and including a pair of sidewardly-spaced portions which respectively engage a rear edge of the respective sheet, said shuttle having sheet-engaging lugs which are positioned for engaging a rearwardly facing edge of the respective sheet and reciprocate back and forth generally parallel with said guide rail, said lugs being independently adjustable relative to the forward direction so as to permit engagement with different sizes and shapes of said sheets.

10. An apparatus according to claim 1, wherein said first and second support surfaces as defined on said first and second table portions are vertically spaced a small distance apart.

11. A splicing apparatus for creating a seam weld along overlapping edge portions of first and second metal sheets, comprising:
frame means;
a welding assembly including upper and lower weld rolls supported for rotation about substantially horizontal axes which are vertically spaced apart, said upper and lower weld rolls being positioned substantially directly vertically one above the other so as to define a nip which extends horizontally therebetween for accommodating overlapping edge portions of said sheets;
drive means coupled to said weld rolls for effecting rotation thereof in opposite directions so that the weld rolls drivingly engage the overlapping edge portions of the sheets to effect driving thereof in a forward direction through the nip;
sheet-supporting table means positioned upstream of said weld assembly for substantially horizontally supporting said sheets in generally upwardly facing but side-by-side relation;
horizontally elongated guide means extending centrally along said table means substantially in alignment with an upstream end of said nip for guiding and positioning adjacent edge portions of said sheets into a vertically overlapping relationship prior to feeding thereof into said nip;
said sheet-supporting table means including first and second table portions disposed in side-by-side relationship and respectively defining thereon first and second horizontally-enlarged and upwardly-facing support surfaces for respectively supporting the first and second sheets;
sheet advancing means associated with said table means for simultaneously engaging said first and second sheets when positioned on said first and second table portions for generally horizontally moving said sheets forwardly toward the weld assembly for engagement with the weld rolls; and
skewed roller assemblies positioned directly adjacent and on opposite sides of the weld nip for substantially rolling engagement with upper and lower surfaces of said sheets and for imposing sidewardly directed forces on said sheets which tend to prevent said sheets from moving sidewardly away from one another.

12. An apparatus according to claim 11, wherein each of said table portions includes a roller assembly having a plurality of freely-rotatable rollers disposed for rotation about generally parallel and substantially horizontal axes, the plurality of freely-rotatable rollers defining thereon uppermost points which define the respective support surface for engagement with the respective sheet, said last-mentioned rollers supporting the sheet for forward advancing movement but having the axes thereof slightly skewed relative to a perpendicular to the forward direction so as to urge the sheet inwardly into engagement with the guide means as the sheet is forwardly advanced.

13. An apparatus according to claim 12, including a planish assembly positioned adjacent but downstream of said weld assembly for compressing and reducing the thickness of the seam weld so that the overall thickness thereof is similar in magnitude to the original sheet thickness, said planish assembly including upper and lower planish rollers disposed vertically one above the other and defining a nip therebetween which is generally aligned with the nip of said weld rolls, and pressure means cooperating with said planish rollers for relatively pressing said planish rollers together for effecting compression and flattening of the seam weld as it passes through the planishing nip.

14. An apparatus according to claim 12, wherein the skewed roller assemblies include upper and lower skewed roller subassemblies which grippingly engage the sheets therebetween, said subassemblies defining a pair of skewed rollers disposed in straddling relationship on opposite sides of the respective weld roll, the skewed rollers of each pair being skewed relative to one another and relative to the forward direction so as to impose on the respective sheet a holding force directed inwardly toward the weld roll as the sheet moves forwardly.

15. An apparatus according to claim 14, including drive means coupled to the lower skewed rollers for effecting driving rotation thereof as said skewed rollers engage bottom surfaces of said sheets, the upper skewed rollers being freely rotatably supported for rolling engagement with upper surfaces of the sheets, mounting means supporting said upper skewed rollers for vertical displacement toward and away from said sheets, and pressure means cooperating with said mounting means for urging said upper skewed rollers downwardly toward said skewed lower rolls for effecting secure engagement of the sheets between the upper and lower skewed rollers.

16. An apparatus according to claim 15, wherein said upper and lower weld rolls are each slightly skewed relative to the forward direction and are skewed in opposite directions so that the weld rolls exert sideward forces on the sheets which tend to hold the sheets to prevent sideward separation thereof.

17. An apparatus according to claim 12, wherein said sheet advancing means includes a reciprocal shuttle associated with said table means and including a pair of sidewardly-spaced portions which respectively engage a rear edge of the respective sheet, sad shuttle having sheet-engaging lugs which are positioned for engaging a rearwardly facing edge of the respective sheet and reciprocate back and forth generally parallel with said guide rail, said lugs being independently adjustable relative to the forward direction so as to permit engagement with different sizes and shapes of said sheets.

* * * * *

UNITED STATES PATENT AND TRADEMARK OFFICE
CERTIFICATE OF CORRECTION

PATENT NO. : 5,131,581

DATED : July 21, 1992

INVENTOR(S) : Thomas J. Geiermann

It is certified that error appears in the above-identified patent and that said Letters Patent is hereby corrected as shown below:

Column 14, line 21; after "lower" insert ---skewed---.

Column 16, line 47; change "skewed lower" to
                ---lower skewed---.

Column 16, line 60; change "sad" to ---said---.

Signed and Sealed this

Twenty-first Day of September, 1993

Attest:

BRUCE LEHMAN

Attesting Officer     Commissioner of Patents and Trademarks